US006921106B2

(12) United States Patent
Yasui

(10) Patent No.: US 6,921,106 B2
(45) Date of Patent: Jul. 26, 2005

(54) PASSENGER PROTECTING APPARATUS

(75) Inventor: Katsuaki Yasui, Tokyo (JP)

(73) Assignee: Mitsubishi Denki Kabushiki, Tokyo (JP)

( * ) Notice: Subject to any disclaimer, the term of this patent is extended or adjusted under 35 U.S.C. 154(b) by 0 days.

(21) Appl. No.: 09/861,569

(22) Filed: May 22, 2001

(65) Prior Publication Data

US 2002/0070538 A1 Jun. 13, 2002

(30) Foreign Application Priority Data

Dec. 8, 2000 (JP) .................................... P. 2000-373936

(51) Int. Cl.$^7$ ............................................. B60R 21/32
(52) U.S. Cl. ...................................... 280/735; 342/72
(58) Field of Search ................. 280/735; 701/45; 307/10.1; 342/72; 340/438; 348/77, 143, 148; 382/106, 100, 103, 291

(56) References Cited

U.S. PATENT DOCUMENTS

| 5,118,134 A | | 6/1992 | Mattes et al. ............... 280/735 |
| 5,366,241 A | * | 11/1994 | Kithil ........................ 280/735 |
| 5,531,472 A | * | 7/1996 | Semchena et al. .......... 280/735 |
| 5,943,295 A | * | 8/1999 | Varga et al. ................. 367/99 |
| 6,027,138 A | * | 2/2000 | Tanaka et al. .............. 280/735 |
| 6,113,137 A | * | 9/2000 | Mizutani et al. ............ 280/735 |
| 6,130,706 A | * | 10/2000 | Hart et al. .................. 348/148 |
| 6,141,432 A | * | 10/2000 | Breed et al. ................ 382/100 |
| 6,252,240 B1 | * | 6/2001 | Gillis et al. ............ 250/559.38 |
| 6,302,438 B1 | * | 10/2001 | Stopper et al. ............. 280/735 |
| 6,313,739 B1 | * | 11/2001 | Roth et al. .................. 340/426 |
| 6,324,453 B1 | * | 11/2001 | Breed et al. ................. 701/45 |
| 6,422,598 B1 | * | 7/2002 | Yasui ......................... 280/735 |
| 6,431,592 B2 | * | 8/2002 | Seip ........................... 280/735 |

FOREIGN PATENT DOCUMENTS

| JP | 10-100858 | 4/1998 | ........... B60R/21/32 |
| JP | 11-217056 | 8/1999 | ........... B60R/21/32 |

* cited by examiner

Primary Examiner—David R. Dunn
(74) Attorney, Agent, or Firm—Sughrue Mion, PLLC

(57) ABSTRACT

A passenger protecting apparatus according to the invention is disposed rearward of the position of the head of a driver or another passenger, and is arranged to control the operation thereof in accordance with the output from a position detecting means detecting the distance to the rear surface such as the back of the head, the back etc. of the passenger. According to the invention, there is an advantage of being able to obtain a safer passenger protecting apparatus.

16 Claims, 4 Drawing Sheets

PASSENGER PROTECTING APPARATUS

BACKGROUND OF THE INVENTION

The present invention relates to a passenger protecting apparatus such as an airbag system etc. which is used to protect a passenger at the time of a vehicle collision.

An airbag, at the time of a vehicle collision, is expanded abruptly between a steering wheel or dashboard and a passenger to protect the passenger. It is known, however, that there are cases where this airbag expansion inflicts an injury on the passenger in case a driver drives in a position close to the steering wheel because of his low stature, and in case a distance is very short between the steering wheel or dashboard and the passenger, such as in case a child stands in front of an assistant driver's seat. Thus, in order to prevent such a phenomenon, America intends to legislate for the obligation to install a passenger detecting unit in the passenger protecting apparatus using an airbag.

As a passenger protecting apparatus having a passenger detecting unit therein for this purpose, for example, the one as described in the Unexamined Japanese Patent Application Publication No. Hei 10-100858 is known. The construction of this apparatus will be explained with reference to FIG. 5. In the figure, the reference numeral 1 depicts a windshield of a vehicle, 2 a dashboard, 3 an airbag for a frontal crash housed in the dashboard 2, 4 an assistant driver's seat, 5 a critical region where a person if any is in danger of getting injured in case the airbag is expanded, 6 an interior ceiling of the vehicle, 11 an infrared emission means provided on the dashboard 2 for emitting an infrared beam, and 16 an infrared detection means, provided likewise on the dashboard 2, having a PSD therein, and a position detecting means 20 is composed of the infrared emission means 11 and the infrared detection means 16.

Next, an explanation will be given of the operation. An infrared beam is emitted obliquely upward as shown in the figure from the infrared emission means 11. In case no person is present in the critical region, such as in case an adult sits normally in the assistant driver's seat, etc., this infrared beam reaches the interior ceiling 6 to form an infrared spot thereon. On the contrary, in case a person is present in the critical region, such as in case a child stands in front of the assistant driver's seat, the infrared beam is intercepted by the body of the person so that the infrared spot is formed on the body of the person. By detecting the position of this infrared spot through the infrared detecting means 16, the distance between the dashboard and the body of the person can be detected on the principle of trigonometrical survey. A not-shown ECU, upon determining that this detected distance is so short that it is dangerous to expand the airbag, suppresses the airbag expansion even in case a collision is detected by a not-shown acceleration sensor, so as to prevent the airbag expansion from inflicting an injury on the passenger.

Also, as an example of the passenger protecting apparatus characterized in that there is provided a position detecting means detecting the distance between a dashboard and the body of a person, some methods are known, such as the one using an ultrasonic sensor as described in the Unexamined Japanese Patent Application Publication No. Hei 11-286256, the one using an optical sensor as described in the Unexamined Japanese Patent Application Publication No. Hei 11-217056, etc. However, in any case, the position detecting means is provided on the dashboard ahead of a passenger or at the front end of the interior ceiling of a vehicle to measure the distance to the front surface of the passenger. Accordingly, there is a problem, for example, that, in case the passenger opens up a magazine or newspaper or stretches his arms to the fore, the system misidentifies that a person is present in the critical region so that airbag expansion is suppressed even in the case of the collision which requires the airbag expansion.

Further, since a passenger does not always sit in a normal position, i.e., sometimes sits sidewise out of position, as in the above-mentioned conventional example, in some cases, the method using one infrared beam causes no infrared beam to strike on the body of the passenger.

Meanwhile, as shown in U.S. Pat. No. 5,118,134, a method is known by which the movement of a passenger at the time of a collision is detected by a position detecting means, thereby detecting the collision so as to control the operation of a passenger protecting unit such as an airbag etc. However, in reality, the responsibility and disturbance resistance of a distance sensor are not sufficient, and thus the method has not yet been put to practical use. For example, in the distance sensor using an ultrasonic wave, there is a problem that, due to the limitation of the sound speed, for example, in order to detect a distance of 1 m, in principle, the responsibility cannot be made quicker than 6 mS which the sound takes to travel 1 m back and forth. Also, in the position detecting means using a PSD, there is a problem that, upon attempting to assure a normal operation even under the influence of a strong disturbance light, such as in case the direct sunlight strikes on a passenger, the responsibility cannot be quickened.

Furthermore, there is a problem that, upon attempting to detect not only a longitudinal collision but also a lateral collision by the position detecting means, another position detecting means detecting a lateral position is required separately.

SUMMARY OF THE INVENTION

The invention is made to solve the aforesaid problems and an object thereof is to obtain a passenger protecting apparatus which can control its operational method with safety in a simple construction.

The passenger protecting apparatus according to aspect 1 of the invention is a passenger protecting apparatus comprising:

position detecting means disposed rearward of a head of a passenger inside a vehicle room and detecting a distance to a rear surface such as a back of the head or a back of the passenger; and control means modifying an operational method of protecting means such as an airbag in accordance with a passenger position signal outputted from the position detecting means.

The passenger protecting apparatus according to aspect 2 of the invention is the passenger protecting apparatus according to aspect 1, wherein the position detecting means includes;

infrared emission means emitting a planar infrared sheet or a plurality of infrared beams aligned in a sheet form, and a two-dimensional image sensor detecting positions of light spots which are scattered by the infrared sheet or the beams striking on the passenger, and the control means modifies the operational method of the protecting means such as the airbag in accordance with the passenger position signal outputted from the position detecting means.

The passenger protecting apparatus according to aspect 3 of the invention is the passenger protecting apparatus according to aspect 2, wherein the control means includes;

means for determining validity of an output result of the position detecting means in accordance with shapes of the light spots, which are scattered by the infrared sheet or the beams striking on the passenger sensed by the two-dimensional image sensor.

The passenger protecting apparatus according to aspect 4 of the invention is a passenger protecting apparatus comprising:

infrared emission means emitting a planar infrared sheet or a plurality of infrared beams aligned in a sheet form;

position detecting means having an image sensor with a frame rate of 200 fps or more detecting positions of light spots which are scattered by the infrared sheet or the beams striking on a passenger; and collision detecting means detecting a collision based on a passenger position signal outputted from the position detecting means.

The passenger protecting apparatus according to aspect 5 of the invention is a passenger protecting apparatus comprising:

infrared emission means emitting a planar infrared sheet or a plurality of infrared beams aligned in a sheet form;

position detecting means having an image sensor with a frame rate of 200 fps or more detecting positions of light spots which are scattered by the infrared sheet or the beams striking on a passenger; and collision detecting means detecting an occurrence of a collision as well as a direction of the collision based on a passenger position signal outputted from the position detecting means.

The passenger protecting apparatus according to aspect 6 of the invention is the passenger protecting apparatus according to any one of aspects 2 to 5, further comprising:

a two-dimensional CMOS image sensor having a projecting function.

DETAILED DESCRIPTION OF THE PREFERRED EMBODIMENTS (First Embodiment)

Figure 1:
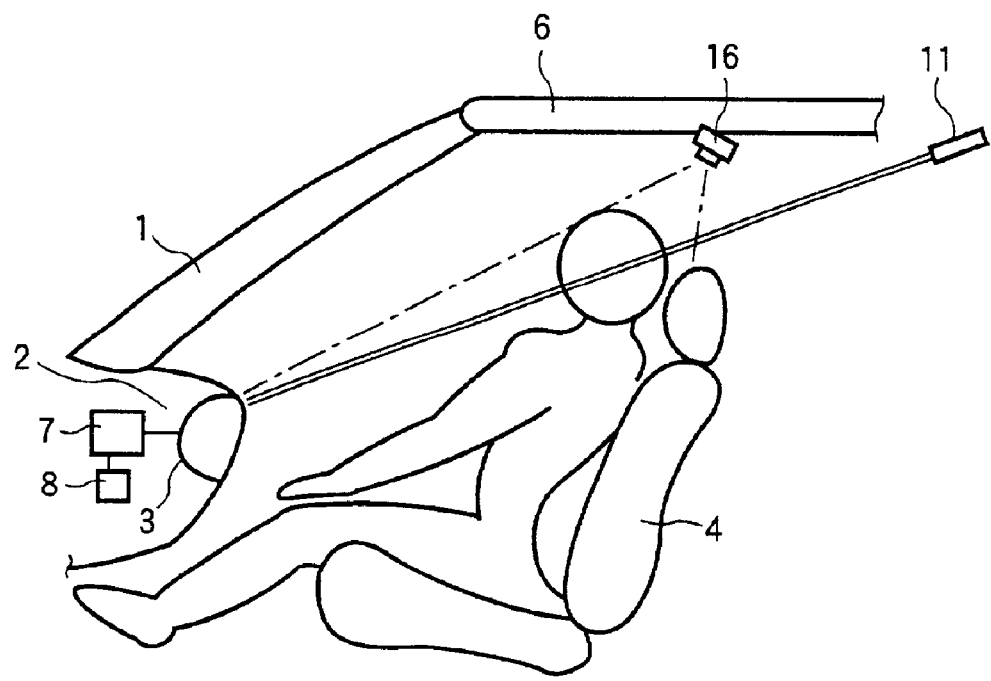
FIG. 1 is a block diagram of the passenger protecting apparatus according to the first and second embodiments of the invention.
Figure 5:
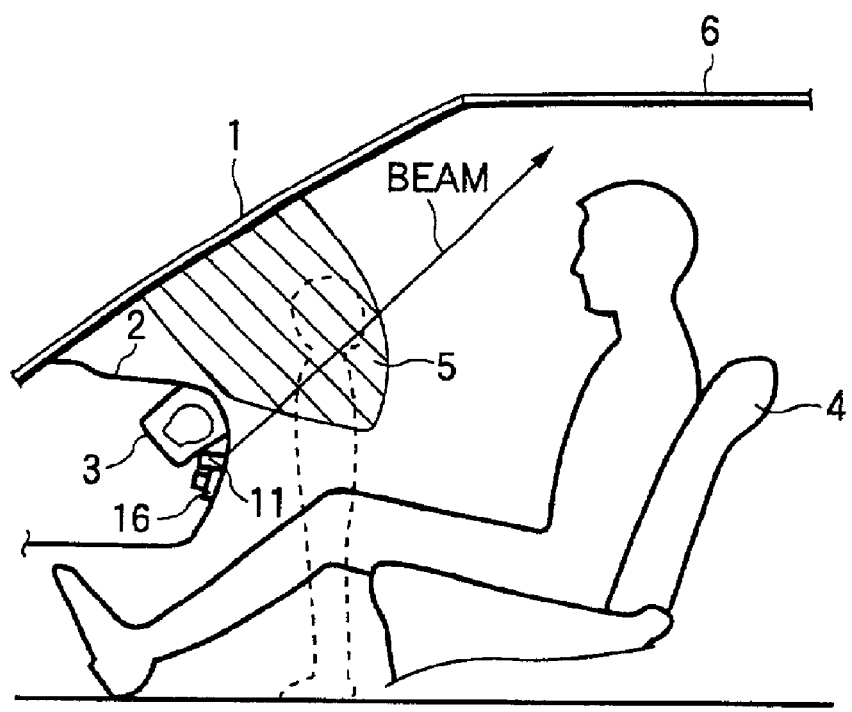
FIG. 5 is a block diagram showing a conventional passenger protecting apparatus.

FIG. 1 is a block diagram in the case where the passenger protecting apparatus according to the first embodiment of the invention is provided in an assistant driver's seat. In the figure, identical numerals refer to the members and regions identical or equal to those in FIG. 5 of the conventional example.

In the figure, the reference numeral 1 depicts a windshield of a vehicle, 2 a dashboard, 3 an airbag for an assistant driver's seat against a frontal crash housed in the dashboard 2, 8 an acceleration sensor for detecting a collision, 7 an ECU controlling airbag expansion, 4 an assistant driver's seat, 6 an interior ceiling of the vehicle, 11 an infrared emission means provided on the dashboard 2 for emitting an infrared sheet, and 16 an infrared detection means provided likewise on the dashboard 2, and a position detecting means 20 is composed of the infrared emission means 11 and the infrared detection means 16.

Figure 2:
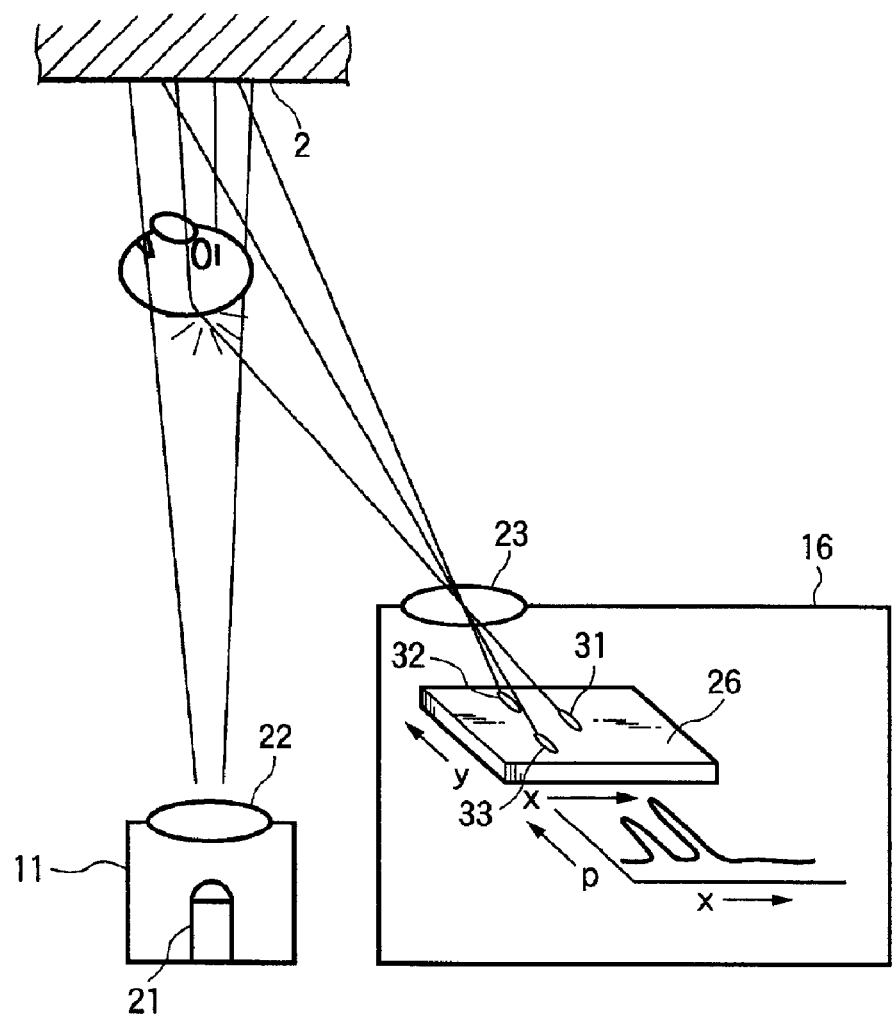
FIG. 2 is a block diagram for illustrating the operation of the position detecting means of the passenger protecting apparatus according to the first and second embodiments of the invention.

FIG. 2 is a block diagram for illustrating the operation of this position detecting means 20. In the infrared emission means 11, the reference numeral 21 depicts an infrared LED, and 22 a cylindrical surface lens. In the infrared detection means 16, the numeral 23 depicts a condensing lens, and 26 a two-dimensional CMOS image sensor.

Next, an explanation will be given of the operation.

The infrared ray emitted from the LED 21, through the cylindrical surface lens 22 and another not-shown optical system, is shaped in a sheet form which is narrowed in width vertically relative to the vehicle room and spread fanwise laterally relative to the same. In case no passenger is present in the assistant driver's seat, this infrared ray reaches the dashboard 2 to form a linear infrared spot thereon. In case an adult sits normally in the assistant driver's seat, as shown in FIG. 2, the infrared ray is adjusted so as to form a linear infrared spot on the back of the head or neck of the passenger. The infrared ray is scattered to form these infrared spots, which are condensed by the lens 23 provided in the infrared detection means 16 and then imaged on the two-dimensional CMOS image sensor 26. An image 31 is the image of the infrared spot formed on the back of the head of the passenger, and images 32 and 33 are the images of the infrared spots which the infrared sheet, brushing past the right and left sides of the head of the passenger, forms on the dashboard.

Like many sensors of this kind, the LED 21 flashes in synchronization with the frame rate of the CMOS image sensor 26, using the so-called method of synchronous detection, in which, by taking a difference between the image sensor output in an illuminated state of the LED 21 and the image sensor output in an extinguished state of the LED 21, only the infrared spots formed by the LED 21 are detected without being influenced by a disturbance light even in case the disturbance light is strong.

The longitudinal position of the head of the passenger, on the principle of trigonometrical survey, can be determined in accordance with the position of the image 31 in the x direction as shown in the figure. Consequently, in case the passenger position signal outputted from the position detecting means 20 indicates a position spaced a sufficient distance from the airbag for a frontal crash, the ECU 7 determines that an adult sits normally in the assistant driver's seat, and thus controls so as to expand the airbag for a frontal crash in case the acceleration sensor detects the frontal crash.

In case the passenger position signal outputted from the position detecting means 20 indicates a position very close to the dashboard, the ECU 7 determines that it is dangerous to expand an airbag, and thus suppresses the expansion of the airbag for a frontal crash even in case the acceleration sensor detects the frontal crash.

In case the passenger position signal outputted from the position detecting means 20 indicates a position slightly close to the dashboard, the ECU 7 determines that it is dangerous to expand an airbag strongly but the expansion is still required, and thus controls so as to expand the airbag for a frontal crash with a weak force even in case the acceleration sensor detects the frontal crash.

The sidewise position of the head of the passenger can be determined in accordance with the position of the image 31 in the y direction as shown in the figure. Consequently, in case the position of the passenger is too close to a not-shown side airbag, the ECU 7 determines that it is dangerous to expand an airbag strongly, and thus suppresses the expansion of the side airbag even in case the acceleration sensor detects a side collision, or controls so as to expand the side airbag with a weak force.

Figure 3:
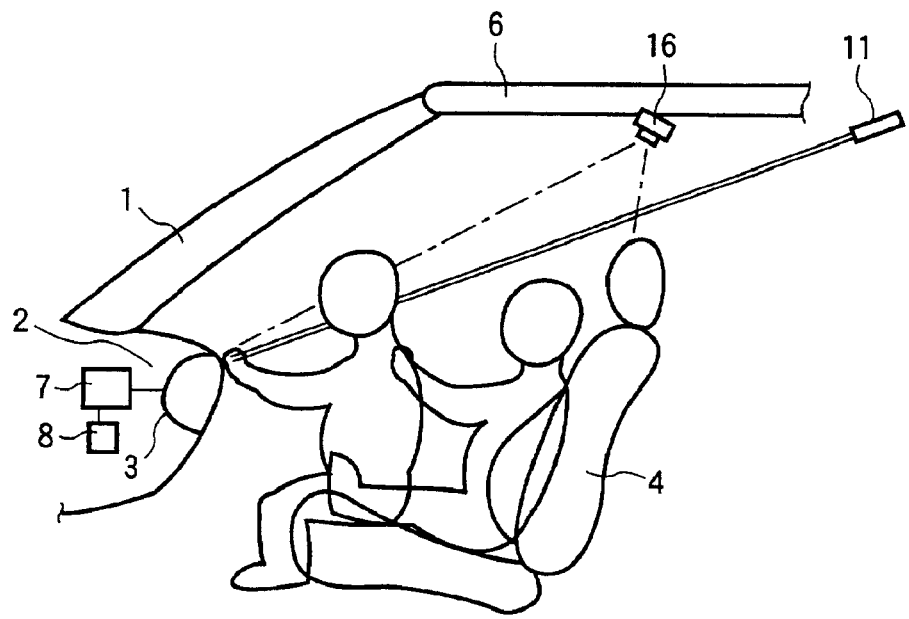
FIG. 3 is a block diagram showing the case where a child sits in the assistant driver's seat provided with the passenger protecting apparatus according to the first embodiment of the invention.

In the image sensor 26, in case the image 31 is not observed, the ECU 7 determines that no passenger is present in the assistant driver's seat or, as shown by the figure of the passenger on the right side in FIG. 3, the passenger is a child whose sitting height does not reach the infrared sheet.

It is known that, in case no passenger is present in the assistant driver's seat, it is uneconomical to use the airbag for the assistant driver's seat, and in case the passenger in the assistant driver's seat is a child, it is safer not to expand an airbag with a strong force. Hence, the ECU 7 suppresses the expansion of the airbag for a frontal crash even in case the acceleration sensor detects the frontal crash, or controls so as to expand the airbag with a weak force to provide for the case where a child sits therein.

As shown on the left side in FIG. 3, in case the passenger in the assistant driver's seat is a child who sits in a position close to the dashboard or stands in front of the dashboard, the passenger position signal outputted from the position detecting means indicates a position too close to the dashboard. Hence, the ECU 7 determines that it is dangerous to expand an airbag strongly, and thus suppresses the expansion of the airbag for a frontal crash even in case the acceleration sensor detects the frontal crash, or controls so as to expand the airbag with a weak force.

Figure 4:
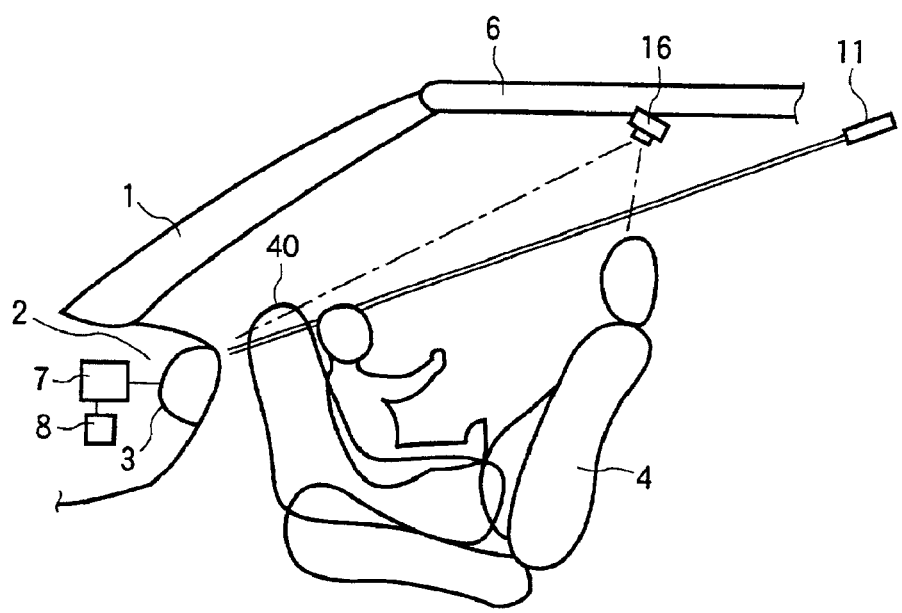
FIG. 4 is a block diagram showing the case where a child seat is mounted facing backward in the assistant driver's seat provided with the passenger protecting apparatus according to the first embodiment of the invention.

As shown in FIG. 4, in case a child seat is mounted facing backward in the assistant driver's seat, the passenger position signal outputted from the position detecting means always indicates a position close to the dashboard. Hence, the ECU 7 determines that it is dangerous to expand an airbag since the object is fixed, due to the fact that it is not a passenger but there exists a fixed child sheet facing backward, and thus suppresses the expansion of the airbag for a frontal crash even in case the acceleration sensor detects the frontal crash.

In case the width of the image 31 observed in the image sensor 26 is excessively greater than the assumed width, the ECU 7 determines that the position detecting means 20 does not catch the passenger accurately and generates a false output, and thus does not use the false output for airbag expansion control.

(Second Embodiment)

In the above-mentioned first embodiment, the position detecting means 20 detects only the static position of the passenger, and the occurrence of a collision is detected by the acceleration sensor 8. In order to expand an airbag early, the determination of a collision is preferably completed as early as possible after the collision. However, in determining only in accordance with a short-time acceleration signal, there are cases of malfunction resulting from any other cause than a collision, such as when the vehicle runs on to a sharp rising in ground level. Hence, in order to enhance the reliability of collision detection, it is quite usual to use a somewhat long-time acceleration waveform.

Therefore, the arrangement may be such that the movement of the passenger is detected from the dynamic output change generated from the position detecting means 20 at the time of a collision so as to be made an auxiliary to the collision detection, or the occurrence of a collision is detected only by the position detecting means 20.

A collision sensor for airbag control is supposed to be required to detect a collision within a time period of 10 to 15 mS after the occurrence of the collision. Therefore, in case a collision is determined by an acceleration sensor, the acceleration waveform within the entire time period is used for the determination. The detection of a collision by an image sensor requires the observation with at least 2 frames within this time period, i.e., a frame rate of 200 fps or more, preferably, 1000 fps or more. However, generally, since a two-dimensional image sensor has many pixels, it is difficult to achieve such a high-speed frame rate.

Accordingly, in the second embodiment, a CMOS type of image sensor having a projecting function is used as the image sensor 26. The projecting function is not a function to output the respective luminance values of all pixels like a normal two-dimensional image sensor. As shown in the graph on the lower right of FIG. 2, in case of detecting a longitudinal position, the projecting function is the function to output as a one-dimensional data in a lump the total amount of luminance values of the pixels in the z direction with respect to each of the respective pixel rows in the x direction, i.e., the function to enable the image sensor 26 to operate as a linear image sensor. For example, in case of using a 32×32 dot image sensor, normally, it is required to output the luminance value of each of the entire 1024 pixels. On the other hand, in case of using the projecting function, all to do is to output one luminance value per row in the x direction, i.e., 32 luminance values in total. Hence, a very high-speed frame rate of 1000 fps or more is achievable, and thus the image sensor 26 is applicable as a collision sensor.

In the second embodiment, at normal times, the image sensor 26, as an original two-dimensional image sensor, operates to detect the static position of the passenger in the same manner as in the above-mentioned first embodiment. In addition, the moment the longitudinal acceleration sensor detects acceleration above a definite value, the image sensor 26 is arranged to operate as a high-speed linear image sensor in the x direction using the projecting function. The moment the lateral acceleration sensor detects acceleration above a definite value, the image sensor 26 is arranged to operate as a high-speed linear image sensor in the z direction using the projecting function. Thereby, an auxiliary role to the collision sensor is assigned on the image sensor 26. In the same manner as in the first embodiment, the influence of a disturbance light is prevented by the use of the method of synchronous detection. By this auxiliary, it becomes possible to determine a collision earlier and more surely than the collision is determined only in accordance with the output from the acceleration sensor.

Also, in the second embodiment, the movement of the passenger at the moment of a collision can be observed in real time, thereby enabling a more advanced airbag expansion control. For example, for such reasons that the passenger sits within a normal position range and does not fasten a seat belt, etc., right before a collision, the passenger, right after the collision, approaches the dashboard more rapidly than expected, and thus becomes in danger if the airbag is expanded. Even in such a case, it becomes possible to control the airbag expansion with safety.

Further, as shown in FIG. 3, in such a case that a child sits in a normal position right before a collision and is thrown off ahead at the time of the collision, the position detecting means 20 does not detect the passenger at first, and then starts to detect his head a definite time period after the collision. Hence, the ECU 7 can identify the fact, in real time, that the child is thrown off. Therefore, this allows for a more advanced control, adaptable to circumstances, of the passenger protecting apparatus.

Furthermore, in FIGS. 1 to 3, in order to simplify an understanding of the construction, the infrared emission means 11 and the infrared detection means 16 are depicted fairly apart from each other. Alternatively, in practice, the respective means may be placed at a smaller distance to be adapted to integration.

Also, in the above-mentioned first and second embodiments, the infrared emission means is arranged to emit an infrared ray in a wide sheet so that an infrared spot is projected on the rear surface of the passenger even in case the position of the passenger is displaced sidewise. Alternatively, in order to achieve the same object, a plurality of infrared beams aligned in a sheet form may be used.

Further, in order to detect the position of one passenger, one set of infrared emission means and infrared detection means is used in the above-mentioned first and second embodiments, and alternatively a plurality of sets of infrared emission means and infrared detection means may be used for insurance purposes.

Still further, in the above-mentioned first and second embodiments, the airbag expansion controller for the assistant driver's seat is described. Also, the controller is similarly applicable as the operation controller of a protecting means at the time of a collision for a passenger in another position.

As described above, according to the invention, the operation of a protecting unit such as an airbag etc. is arranged to be controlled in accordance with the output from a position detecting means disposed rearward of the head of a driver or another passenger and detecting the distance to the rear surface such as the back of the head, the back etc. of the passenger. Accordingly, there is an advantage of being able to obtain a safer passenger protecting apparatus.

What is claimed is:

1. A passenger protecting apparatus comprising:
    position detecting means only disposed rearward of a head position of a seated passenger inside a vehicle room and detecting a distance to a rear surface of the seated passenger, wherein there are no position detecting means disposed in front of the head position of the seated passenger when said seated passenger is sitting substantially erect; and
    control means modifying an operational method of protecting means such as an airbag in accordance with a passenger position signal outputted from said position detecting means.

2. The apparatus according to claim 1, wherein said rear surface is a back of said head or a back of the seated passenger.

3. The apparatus according to claim 1, wherein the apparatus does not include a camera.

4. A passenger protecting apparatus comprising:
    position detecting means only disposed rearward of a head position of a passenger inside a vehicle room and detecting a distance to a rear surface of the passenger, wherein there are no position detecting means disposed in front of the head position of the passenger when said seated passenger is sitting substantially erect; and
    control means modifying an operational method of protecting means such as an airbag in accordance with a passenger position signal outputted from said position detecting means, wherein
    said control means includes;
    means for determining validity of an output result of said position detecting means in accordance with shapes of light spots, which are scattered by said infrared sheet or said beams striking on a surface of the passenger sensed by a two-dimensional image sensor.

5. A passenger protecting apparatus comprising:
    infrared emission means emitting a planar infrared sheet or a plurality of infrared beams aligned in a sheet form;
    position detecting means having an image sensor with a frame rate of 200 fps or more detecting positions of light spots which are scattered by said infrared sheet or the beams striking on a surface of a passenger; and
    collision detecting means detecting an occurrence of a collision as well as a direction of said collision based on a passenger position signal outputted from said position detecting means.

6. The passenger protecting apparatus according to claim 5, further comprising:
    a two-dimensional CMOS image sensor having a projecting function.

7. A passenger protecting apparatus comprising:
    position detecting means disposed rearward of a head position of a passenger inside a vehicle room and detecting a distance to a rear surface of the passenger;
    control means modifying an operational method of protecting means in accordance with a passenger position signal outputted from said position detecting means; and
    a two-dimensional CMOS image sensor having a projecting function that enables the CMOS image sensor to operate as a linear image sensor.

8. The apparatus according to claim 7, wherein when detecting a longitudinal position, the projecting function outputs, as one-dimensional data, luminance values of pixels in a z-direction with respect to corresponding pixel rows in an x-direction.

9. The apparatus according to claim 7, wherein the protecting means is an airbag.

10. A passenger protecting apparatus comprising:
    infrared emission means emitting a planar infrared sheet or a plurality of infrared beams aligned in a sheet form;
    position detecting means having an image sensor with a frame rate of 200 fps or more detecting positions of light spots which are scattered by said infrared sheet or the beams striking on a surface of a passenger;
    collision detecting means detecting a collision based on a passenger position signal outputted from said position detecting means; and
    a two-dimensional CMOS image sensor having a projecting function that enables the CMOS image sensor to operate as a linear image sensor.

11. The apparatus according to claim 10, wherein when detecting a longitudinal position, the projecting function outputs, as one-dimensional data, luminance values of pixels in a z-direction with respect to corresponding pixel rows in an x-direction.

12. A passenger protecting apparatus comprising:
    position detecting means only disposed rearward of a head position of a passenger inside a vehicle room and detecting a distance to a rear surface of the passenger, wherein there are no position detecting means disposed in front of the head position of the passenger;

control means modifying an operational method of protecting means such as an airbag in accordance with a passenger position signal outputted from said position detecting means; and a two-dimensional CMOS image sensor having a projecting function, wherein when acceleration is greater than a predetermined value, the two-dimensional CMOS image sensor operates as a linear image sensor.

13. A passenger protecting apparatus comprising:

position detecting means disposed rearward of a head position of a passenger inside a vehicle room and detecting a distance to a rear surface of the passenger; and control means modifying an operational method of protecting means in accordance with a passenger position signal outputted from said position detecting means, wherein said detecting is performed utilizing a principle of trigonometric surveying, whereby a position of a small beam spot caused by hitting at least a driver is observed by a camera located at a position that is different from a position of the position detecting means and the control means.

14. The apparatus according to claim 13, wherein the protecting means is an airbag.

15. A passenger protecting apparatus comprising:

position detecting means only disposed rearward of a head position of a passenger inside a vehicle room and detecting a distance to a rear surface of the passenger, wherein there are no position detecting means disposed in front of the head position of the passenger; and control means modifying an operational method of protecting means such as an airbag in accordance with a passenger position signal outputted from said position detecting means, wherein said position detecting means comprises at least one infrared emission means and at least one infrared detection means, said at least one infrared emission means and said at least one infrared detection means being only disposed rearward of the head position of the passenger inside the vehicle room.

16. A passenger protecting apparatus comprising:

position detecting means only disposed rearward of a passenger seat that has a substantially erect back portion, inside a vehicle room, and detecting a distance to a rear surface of one of a seated passenger and a standing passenger, wherein there are no position detecting means disposed in front of the head position of said one of the seated passenger and the standing passenger; and control means modifying an operational method of protecting means such as an airbag in accordance with a passenger position signal outputted from said position detecting means.

* * * * *